US008185745B2

(12) United States Patent
Singh et al.

(10) Patent No.: US 8,185,745 B2
(45) Date of Patent: *May 22, 2012

(54) DETECTION OF FREQUENT AND DISPERSED INVARIANTS

(75) Inventors: Sumeet Singh, Fremont, CA (US); John David Huber, San Diego, CA (US); Flavio Giovanni Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/956,725

(22) Filed: Nov. 30, 2010

(65) Prior Publication Data

US 2011/0131655 A1    Jun. 2, 2011

Related U.S. Application Data

(62) Division of application No. 11/427,696, filed on Jun. 29, 2006, now Pat. No. 7,873,833.

(51) Int. Cl.
*H04L 9/32* (2006.01)
*G06F 11/00* (2006.01)

(52) U.S. Cl. ......... 713/180; 713/176; 713/177; 726/23; 726/24; 726/25

(58) Field of Classification Search ............ 713/176, 713/177, 180; 726/23–25
See application file for complete search history.

(56) References Cited

U.S. PATENT DOCUMENTS

| 7,185,368 | B2 | 2/2007 | Copeland, III |
| 7,231,440 | B1 * | 6/2007 | Kouznetsov et al. ......... 709/224 |
| 7,363,656 | B2 | 4/2008 | Weber et al. |
| 7,444,515 | B2 | 10/2008 | Dharmapurikar et al. |
| 7,454,418 | B1 | 11/2008 | Wang |
| 7,512,980 | B2 | 3/2009 | Copeland et al. |
| 7,549,169 | B1 * | 6/2009 | Sobel et al. ............... 726/26 |
| 2004/0255163 | A1 * | 12/2004 | Swimmer et al. ............ 713/201 |
| 2005/0022016 | A1 * | 1/2005 | Shipp ............... 713/201 |
| 2005/0108573 | A1 | 5/2005 | Bennett et al. |
| 2005/0210533 | A1 | 9/2005 | Copeland et al. |
| 2006/0107321 | A1 | 5/2006 | Tzadikario |
| 2008/0022106 | A1 | 1/2008 | Singh et al. |

FOREIGN PATENT DOCUMENTS

WO    WO-2008002801 A1    1/2008

OTHER PUBLICATIONS

U.S. Appl. No. 11/427,696, Non Final Office Action Mailed Oct. 2, 2009, 11 pgs.
U.S. Appl. No. 11/427,696, Notice of Allowance mailed Aug. 9, 2010, 11 pgs.

(Continued)

*Primary Examiner* — Mohammad Reza
(74) *Attorney, Agent, or Firm* — Schwegman, Lundberg & Woessner, P.A.

(57) ABSTRACT

A scalable method and apparatus that detects frequent and dispersed invariants is disclosed. More particularly, the application discloses a system that can simultaneously track frequency rates and dispersion criteria of unknown invariants. In other words, the application discloses an invariant detection system implemented in hardware (and/or software) that allows detection of invariants (e.g., byte sequences) that are highly prevalent (e.g., repeating with a high frequency) and dispersed (e.g., originating from many sources and destined to many destinations).

20 Claims, 12 Drawing Sheets

OTHER PUBLICATIONS

U.S. Appl. No. 11/427,696, Response filed Jan. 4, 2010 to Non Final Office Action mailed Oct. 2, 2009, 13 pgs.
U.S. Appl. No. 11/427,696, Restriction Requirement mailed Apr. 15, 2010, 7 pgs.
International Application Serial No. PCT/US2007/071560, International Search Report and Written Opinion dated May 5, 2008, 7 pgs.
Singh. S., et al., "Automated Worm Fingerprinting", obtained from http://www-cse.ucsd.edu/~savage/papers/OSDI04.pdf#search='Automated%20Worm%20Fingerprinting', 16 pgs.

* cited by examiner

DETECTION OF FREQUENT AND DISPERSED INVARIANTS

CLAIM OF PRIORITY

This application is a divisional of and claims the benefit of priority under 35 U.S.C. §120 to U.S. patent application Ser. No. 11/427,696, filed on Jun. 29, 2006, now U.S. Pat. No. 7,873,833, issued on Jan. 18, 2011, which is hereby incorporated by reference herein in its entirety.

BACKGROUND

The amount of data available to information seekers has grown astronomically, whether as the result of the proliferation of information sources on the Internet, or as a result of private efforts to organize business information within a company, or any of a variety of other causes. The need to be able to securely access information and/or data has increased as well. The proliferation of data and expanding number of users has created more avenues for computer-related attacks (e.g., viruses, worms, Trojan horses . . . ).

Network viruses and worms are an ever growing threat to security of today's Internet-connected hosts and networks. A worm can be described as a destructive program that automatically replicates itself throughout disk and memory using up the computer's resources and possibly shutting down the system. Generally, a virus refers to malicious software that can infect a computer. After virus code is written, it is often buried within or otherwise attached to an existing program. Once a host program is executed, the virus is activated and attaches copies of itself to other programs in the system. Infected programs automatically copy the virus to other programs.

Because one characteristic of the Internet is unrestricted access, it is relatively easy for worms to propagate across networks thereby causing mass destruction. Most often, by the time a worm is detected, damage has already occurred. Similarly, today's efforts to mitigate damage from and detection of worms have been most often directed to known worms and viruses. A need exists to effectively and accurately detect unknown viruses and worms that plague today's computer networks and systems.

SUMMARY

The following presents a simplified summary of the application in order to provide a basic understanding of some aspects of the application. This summary is not an extensive overview of the technology. It is not intended to identify key/critical elements of the technology or to delineate the scope of the technology. Its sole purpose is to present some concepts of the application in a simplified form as a prelude to the more detailed description that is presented later.

The technology disclosed and claimed herein, in one aspect thereof, comprises a scalable method and apparatus to detect frequent and dispersed invariants. More particularly, the application discloses a system that can concurrently track frequency rates and dispersion criteria of invariants. In one aspect, the scalable system can operate at line rates in excess of 5 Gbps. It is to be understood that the functionality of the technology can operate at a high line rate (e.g., in excess of 5 Gbps) while using an order of magnitude less memory than conventional systems. Many conventional antivirus systems rely upon known signatures of viruses, worms, and the like in order to facilitate detection thereof. The subject matter of the application facilitates detecting unknown and potentially harmful code detecting frequent and dispersed invariants that are typically associated with undesired code.

In other words, in one aspect, the application is directed to an invariant detection system implemented in hardware that allows detection of invariants (e.g., byte sequences) that are highly prevalent (e.g., repeating with a high frequency), and dispersed (e.g., originating from many sources and destined to many destinations). The system also includes various techniques for sampling traffic streams and dynamic thresholding to counter various denial of service attacks that can be mounted against it. In a particular embodiment, the technology can be implemented within a router or other network device. In operation, the router or device can be configured to mirror all in-bound and out-bound traffic to the subject system which can detect, monitor, report, block and/or remove (e.g., quarantine) packets that contain invariants. Moreover, the detection of frequent and dispersed invariants can be implemented by a third-party service or a stand-alone product in accordance with aspects of the application. Similarly, it is to be understood that the subject matter of the application can be employed in portable devices such as cell phones, smartphones, pocket computers, personal data assistants (PDAs) or the like.

To the accomplishment of the foregoing and related ends, certain illustrative aspects of the technology are described herein in connection with the following description and the annexed drawings. These aspects are indicative, however, of but a few of the various ways in which the principles of the technology can be employed and the subject application is intended to include all such aspects and their equivalents. Other advantages and features of the application will become apparent from the following detailed description of the application when considered in conjunction with the drawings.

BRIEF DESCRIPTION OF THE DRAWINGS

FIG. 7 illustrates a DT2 dispersion table in accordance with an aspect of the subject matter of the application.

DETAILED DESCRIPTION

Figure 1:
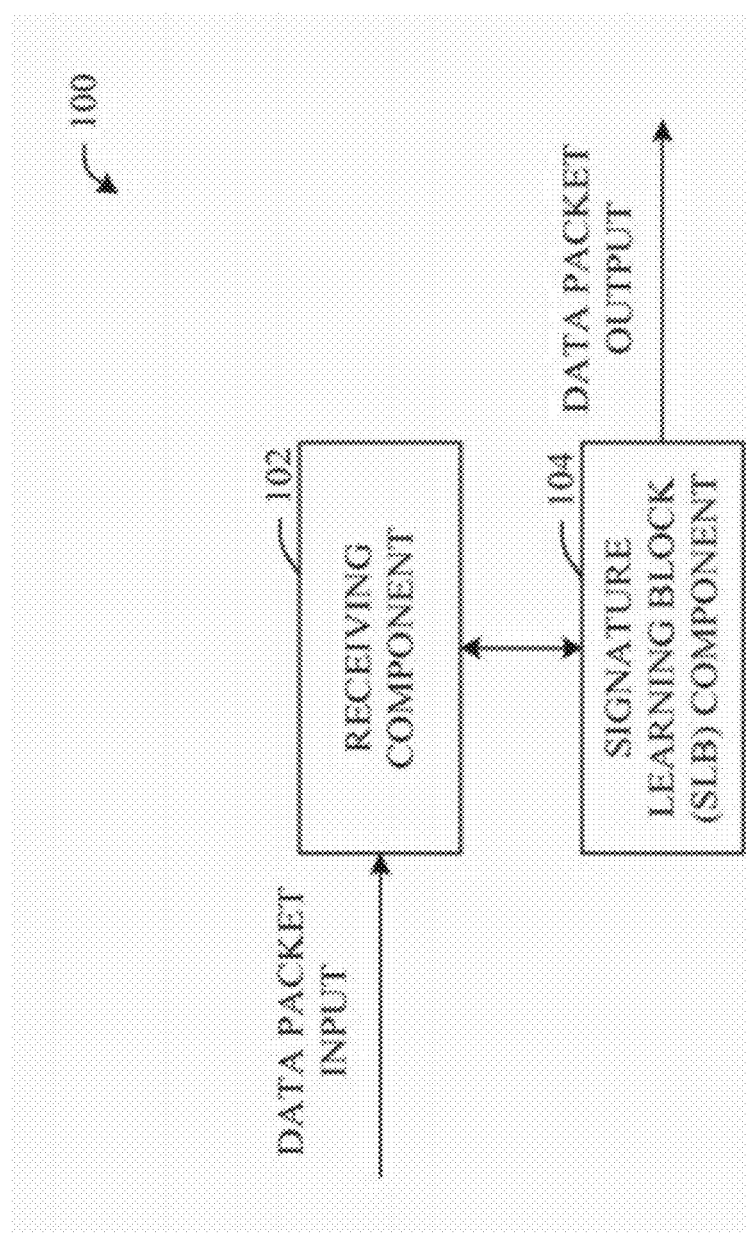
FIG. 1 illustrates a system that facilitates detection of frequent and dispersed invariants in accordance with an aspect of the subject matter of the application.

The technology is now described with reference to the drawings, wherein like reference numerals are used to refer to like elements throughout. In the following description, for purposes of explanation, numerous specific details are set forth in order to provide a thorough understanding of the subject application. It may be evident, however, that the technology can be practiced without these specific details. In other instances, well-known structures and devices are shown in block diagram form in order to facilitate describing the technology.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that can facilitate detection of previously "unknown" worms and/or viruses. Generally, system 100 can include a receiving component 102 and a signature learning block (SLB) component 104. In operation, the receiving component 102 can access packet data thereby communicating with the SLB component 104 to identify worms and/or viruses.

As will be understood upon a review of the figures that follow, the system 100 described herein can employ a "content sifting" technique that addresses the problem of detecting unknown viruses and worms. This "content sifting" technique can create a unique signature and subsequently track instances of that signature in order to identify unknown worms. Generally, the "content sifting" technique is based upon the inherent behavior of a worm. First, the technique leverages that a certain part of a worm code is invariant. And secondly, the system 100 utilizes the characteristic that traffic generated by the worm usually originates and is destined for many different hosts.

As such, the system 100 can employ algorithmic techniques to establish the frequency (e.g., number of occurrences) of each substring of a certain length in the payload of each packet. The algorithm also facilitates approximating a list of all source and destination IP addresses for every such substring. It is to be understood that substrings that occur very often and are associated with many different source and destination addresses are good candidates for a worm signature.

In accordance with the algorithms, approximations can be used to decrease the memory and processor (CPU) requirements of the algorithms such that they can handle significant traffic in real-time. However, with respect to conventional systems, there is a trade-off between available memory and CPU speed of detecting a worm.

The subject application describes a system and methodology that can detect previously unknown viruses and worms based upon the two inherent characteristics stated supra, frequency of the invariant and target destination identification. In operation, the subject application, in one aspect thereof, can automate a signature generation process making it possible to operate at high line rates (e.g., gigabits per second (Gbps)). Thus, maximum security coverage can be accomplished.

To identify threats, algorithmic techniques are employed that can identify invariants (the invariant could be any contiguous byte-sequence at any position in the packet) that are frequent, and then determine the dispersion for each one of the invariants. This is particularly useful if one is interested in detecting all types of large scale attacks, for example, worms, spam etc.

However, if one were to limit their focus to essentially detecting network worms, then an optimization to consider would be to measure both frequency and dispersion simultaneously, as it is only when both conditions hold true (the invariant is prevalent and the invariant is dispersed) that one may classify the invariant as belonging to a new worm outbreak. Here, the subject system 100 can simultaneously track frequency and dispersion through the disclosure of a caching data-structure maintained by the SLB component 104.

This caching data-structure can concurrently count the number of times a particular invariant has been seen as well as track the number of unique sources and destinations using bitmap counters. It is to be appreciated that the basic data-structure can be used to detect a wide variety of behaviors. For instance, the data-structure can be employed to detect misbehaving hosts or to learn content signatures. In a specific example, a misbehaving host refers to one that initiates connections rapidly to a large number of disparate hosts. In this situation, the Source IP address can serve as the invariant and the counting mechanisms in the dispersion table can be used to count the number of events. As well, bitmap counters can be employed to count the number of distinct hosts to which the connection attempts are being initiated. Details of these tracking mechanisms will be better understood upon a review of the figures that follow.

The data-structure can facilitate utilization of an algorithm (e.g., least recently used-like (LRU) algorithm) that cycles through all invariants that are currently being tracked. Depending upon frequency and dispersion rate of the invariant, the system 100 can elect to white-list (e.g., ignore the invariant in the future) or further track it utilizing more state for longer periods of time.

In accordance with aspects, various sampling methods are used at the input point into the data-structure. The techniques used can ensure that the invariants that are sampled (e.g., selected) are spread across time, protocols and packets. It will be understood that these techniques prevent potential cases where attackers could mount denial-of-service attacks against the system 100 by sending large streams of innocuous traffic.

It is further to be appreciated that the technology can be employed to detect and/or track invariants located most anywhere within a data packet. For instance, the functionalities described herein can be employed to detect invariants in a packet header as well as a packet payload. Moreover, these techniques can be implemented in hardware as well as computer-implemented software applications.

Although aspects of the application described herein are directed to the detection of network worms the functionality can be employed to identify other interesting invariants. For example, in addition to detection of worms, the functionality can be employed to enable detection of spam, P2P (Peer to Peer) protocols, etc.

Additionally, although aspects described herein are directed to a specific size invariant, in accordance with the system 100, it is not a requirement that the lengths of the invariants be pre-programmed. For example, a user can select length at run time. With respect to detecting polymorphic types of attacks, one can consider reducing length and then aggregating smaller invariants into larger signatures in a secondary step. Effectively, the technology can be used to identify invariants of most any length as well as variable length in certain situations.

Figure 2:
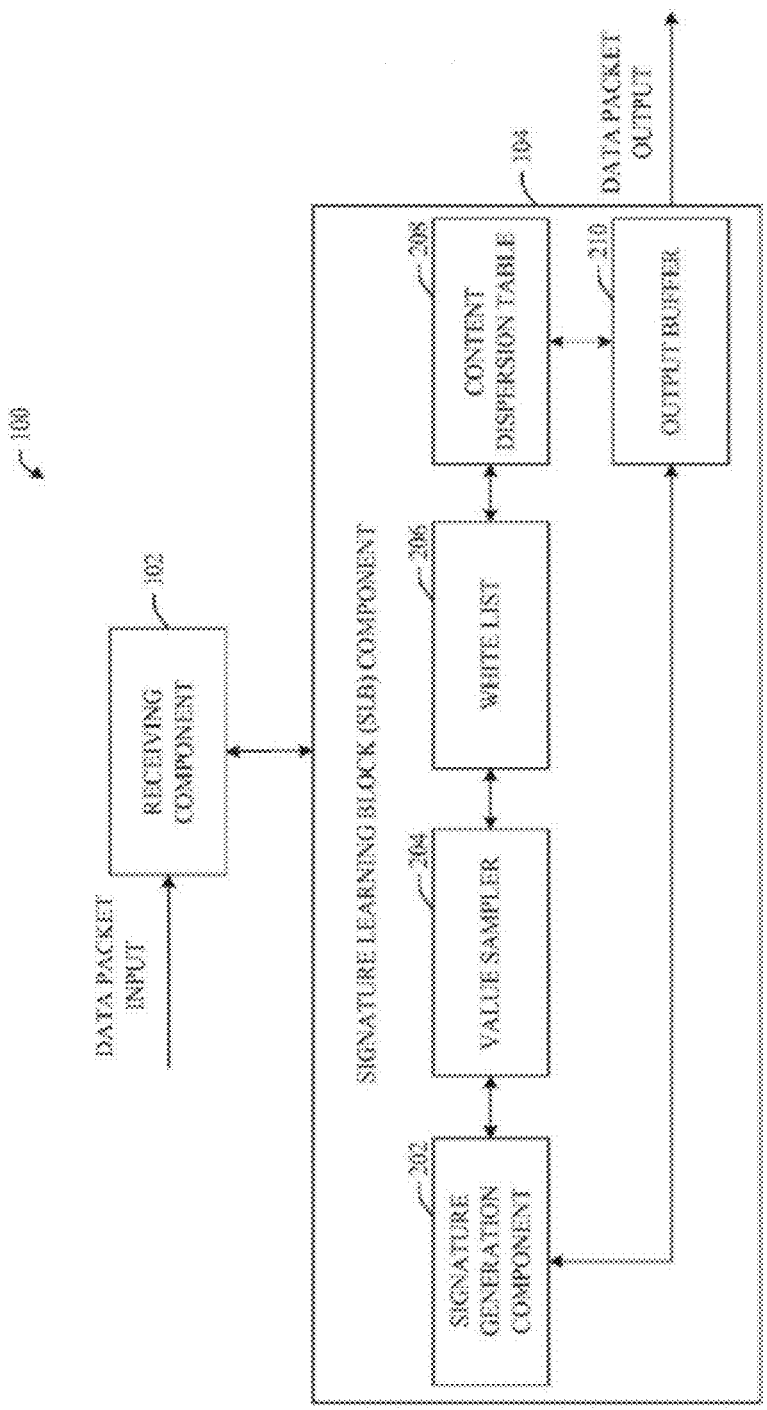
FIG. 2 illustrates an alternative block diagram of an invariant detection system in accordance with an aspect of the subject matter of the application.
Figure 3:
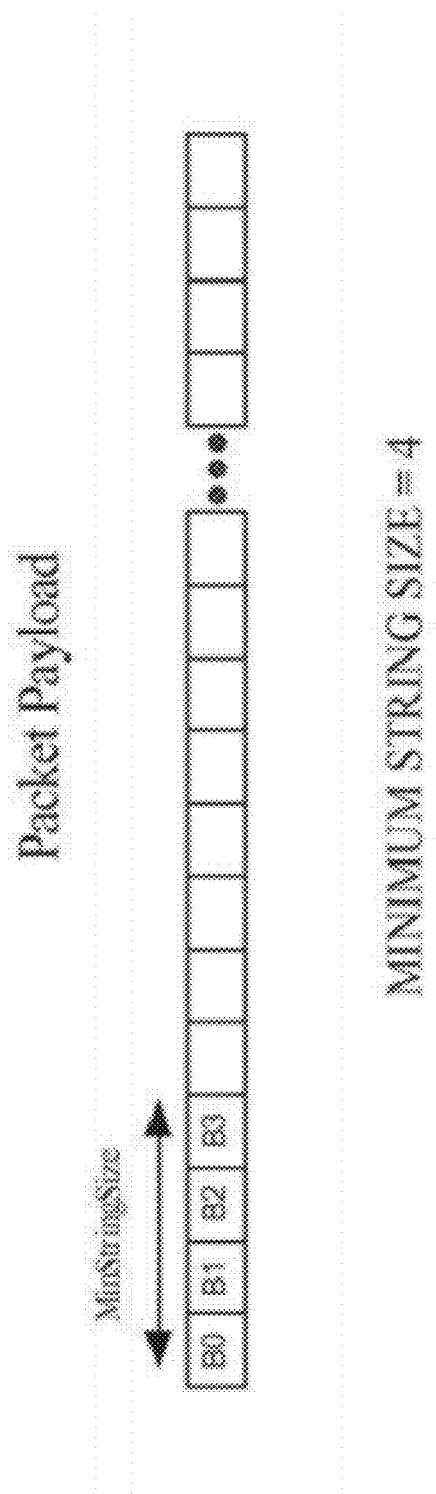
FIG. 3 illustrates an example of a signature calculation for a string length equal to 4 in accordance with an aspect of the subject matter of the application.

Turning now to FIG. 2, an alternative block diagram of system 100 is shown. More particularly, as shown in FIG. 2, SLB component can include multiple sub-components. These sub-components can be a signature generation component 202, a value sampler component 204, a white list component 206, a content dispersion table component 208 and an output buffer component 210. While these components (202-210) are illustrated inclusive of the SLB component, it is to be understood and appreciated that a subset the components can be located remotely without departing from the spirit and scope of this application and claims appended hereto.

In accordance with the system 100, "Signature Learning" uses the fact that anomalous traffic (e.g., worms) typically displays content repetition and address dispersion (e.g., the number of hosts sending/receiving content will grow over time). One key function of the SLB component 102 is to detect the most prevalent invariant strings within the payload of packets, track the dispersion of these invariants, and report those that are characterized by high levels of dispersion.

As illustrated, this functionality can be logically distributed across the following five components: the signature generation component 202 for creating content/header signatures, the value sampler component 204 for reducing downstream workloads, the white list component 206 for eliminating processing on unwanted signatures, the content dispersion table 208 for sifting out the most prevalent signatures and tracking the spreading behavior of these signatures, and the output buffer component 210 for storing the packets and header information while the SLB 104 is processing them. Each of these functional units or components is described in greater detail infra.

Referring first to the signature generation component 202, this component can calculate a hash across a programmable-length, sliding window of the payload of the packet and a header block which calculates a source/destination hash value based on the packet header fields.

In operation, in one embodiment, the signature generator component 202 can receive the packet payload data from the output buffer component 210 accompanied by a valid indication, for example, Start of Packet and an End of Packet indication for the final bytes in a packet, and a packet length. For each StringLen strings within a packet, the signature generator 202 can generate an X-bit content signature based upon a desired hash function. In one aspect, an n-bit content signature can be generated based upon a selected hash function.

Figure 4:
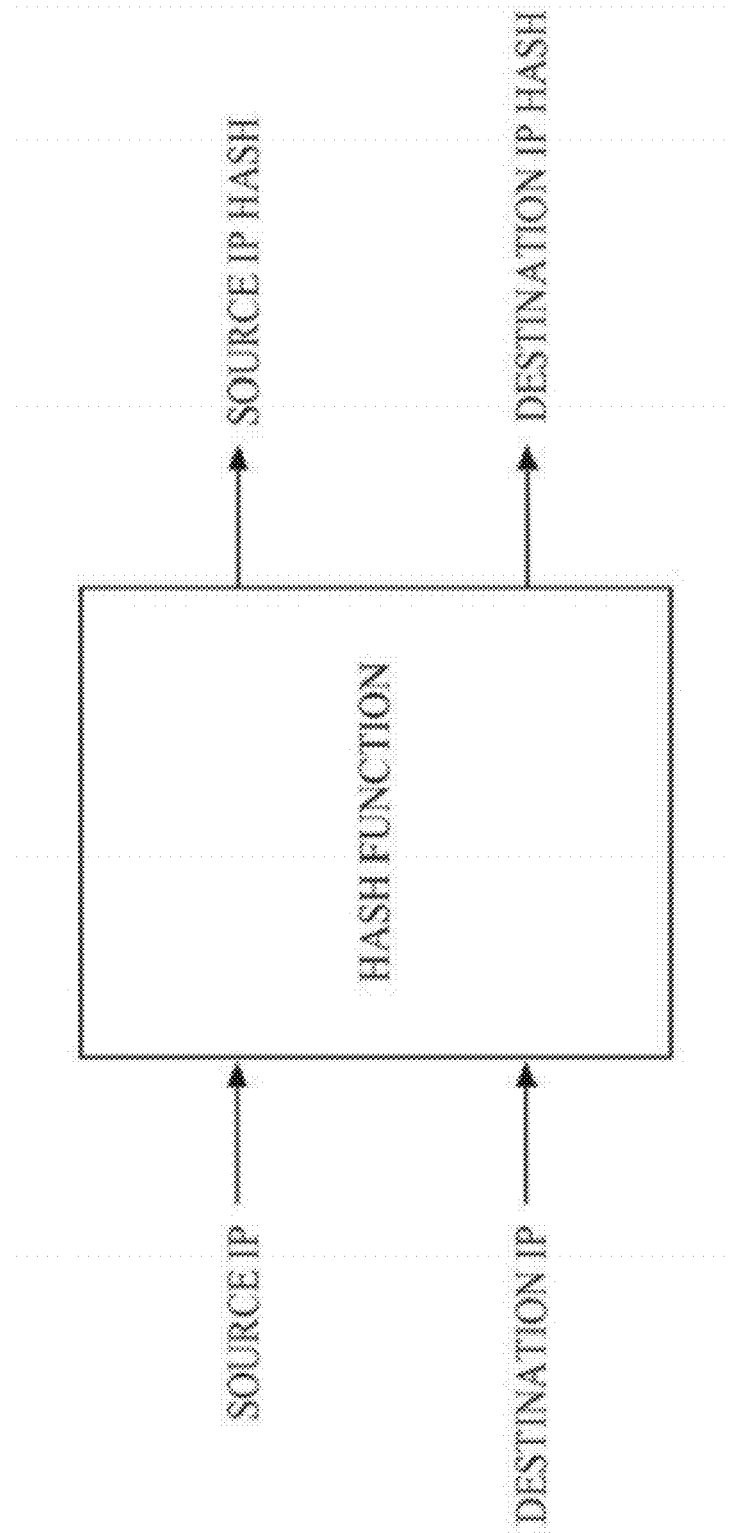
FIG. 4 illustrates a signature generation technique in accordance with an aspect of the subject matter of the application.

The signature generation component 202 can include a header extraction block (not shown) that receives masked header fields for each packet from the output buffer component 210 and generates a Source IP Hash and a Destination IP Hash. The Source and Destination IP Hash values are formed by scrambling the bits and then taking the hash value across all bits of the two scrambled, masked header values. This signature generation is illustrated in FIG. 4.

A source port and destination port can be extracted directly from the packet header by the output buffer 210 based upon programmable offset values into the header. The packet header is sent to the value sampling component 204 where they are correlated to the content signatures for each packet.

Turning now to a discussion of the value sampler component 204, the value sampler 204 can employ a FIFO (first-in first-out) structure for storing the content signature and the header information associated with those signatures. As well, the value sampler 204 can employ sampling logic to determine which signature should be written into the FIFO structure.

For each packet, the value sampler 204 receives the source/destination signature, the source/destination port data, and the protocol stack ID. The signatures and header information are written into the FIFO structure based on value sampling on the signature values and the position of the signatures within the packet. Signatures are received from the signature generation block 202. A fixed number of randomly selected bits of each signature which is received is ANDed with a programmable value sampling and compared to a programmable value lithe values match, the signature is considered to pass value sampling.

Figure 5:
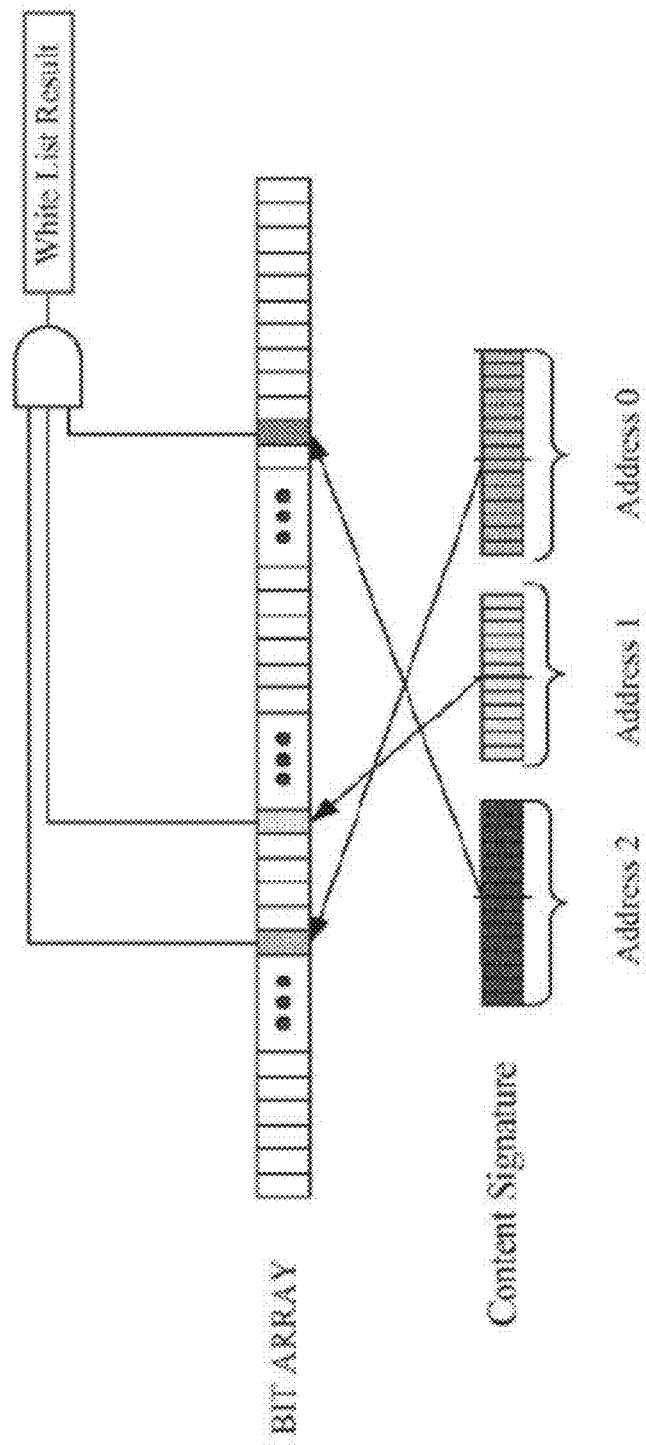
FIG. 5 illustrates a white list filter in accordance with an aspect of the subject matter of the application.

The white list 206 acts as a filter to remove from the traffic stream those "known" signatures which should not be processed by the content dispersion table 208. In one aspect, the white list 206 can be a filter in which entries are added and deleted via an external system. It is to be understood that the external system can include hardware, software or firmware. The white list 206 reads signatures from the value sampler FIFO structure. Each time a signature is received from the value sampler FIFO structure, serial reads are done to the white list memory. The reads can be accomplished based upon addresses within the signature as shown in FIG. 5. In operation, the filter can determine whether or not to pass the signature to the content dispersion table 208.

Figure 6:
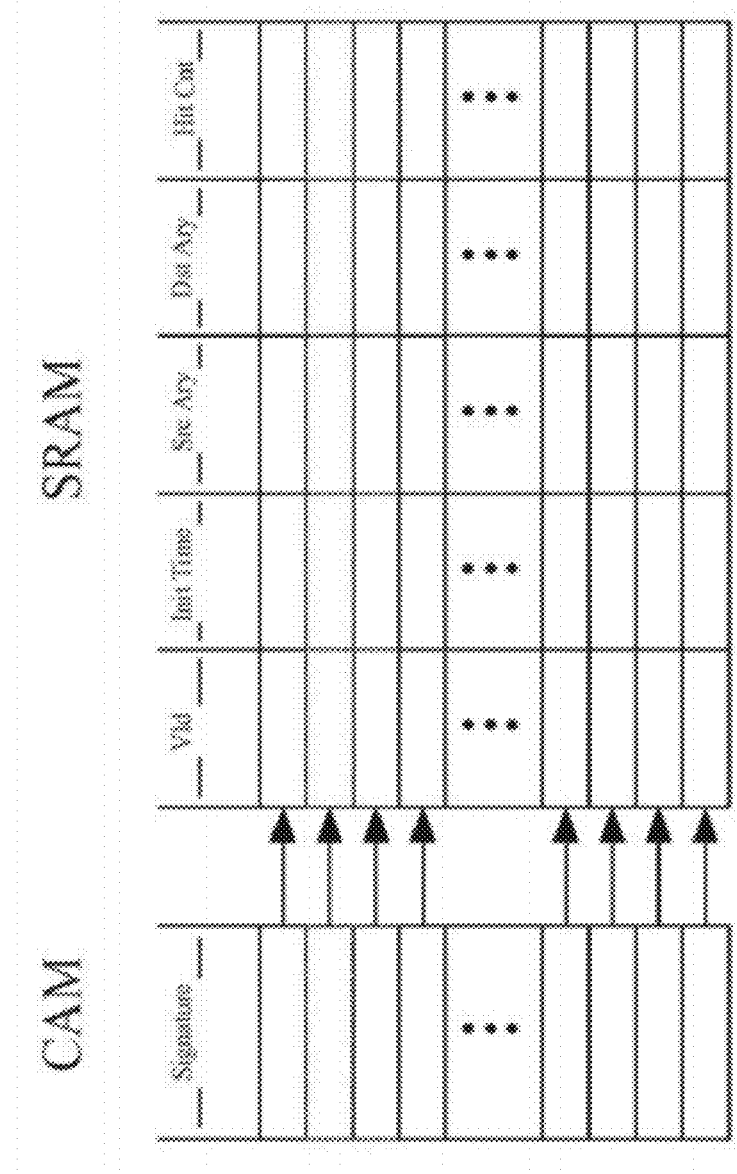
FIG. 6 illustrates a DT1 dispersion table in accordance with an aspect of the subject matter of the application.
Figure 7:
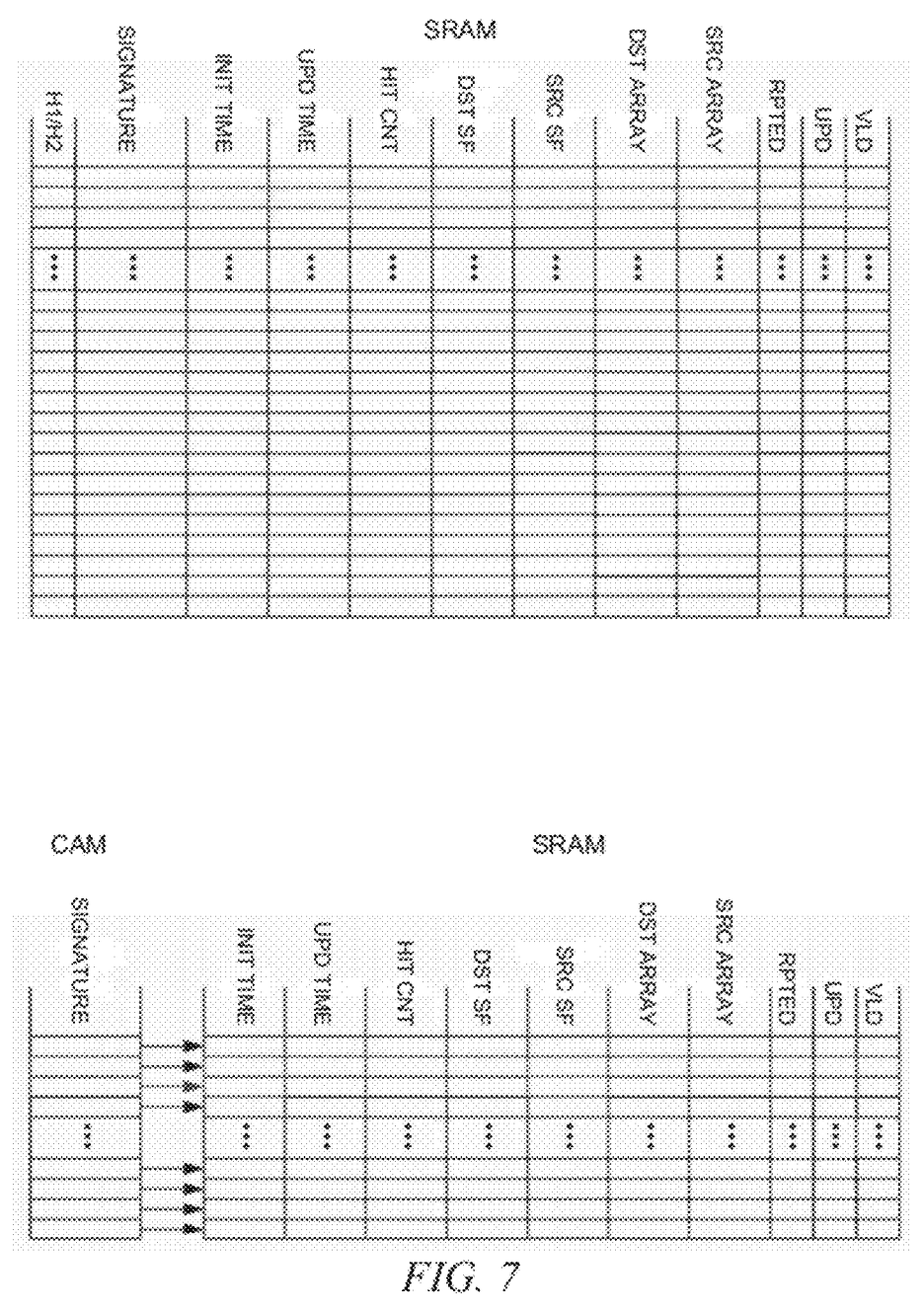

In accordance with the application, the content dispersion table 208 employs two levels of hierarchy, the L1 dispersion table (DT1) and the L2 dispersion table (DT2). These dispersion tables are shown in FIGS. 6 and 7 respectively. The DT1 of FIG. 6 filters out the most prevalent signatures with a minimal level of dispersion before they are added to the DT2 of FIG. 7, which tracks the spreading behavior of signatures at a fine grained level.

Only if a signature displays a minimum level of dispersion is it allowed into the larger DT2. The DT2 then tracks the signature over a longer period of time with more fine-grained tracking of the source and destination dispersion counts and is responsible for reporting the signatures to the director. The data structures which are used by the DT1 and DT2 are shown in FIG. 6 and FIG. 7.

As illustrated in FIG. 7, the DT2 is organized with a first-stage hash based storage and a second-stage CAM (content addressable memory) based storage which is used for overflow, for example, if there are collisions in the hash when trying to add a signature.

When a signature is received from the white list 206, it is simultaneously looked up in the DT1 CAM, the DT2 SRAM-based hash, and the DT2 CAM. It is to be understood that only one entry in any of these structures can match the signature. Accordingly, an error is reported if multiple entries match.

The two CAMs (DT1 and DT2) directly return a match result if the signature is stored in the CAMs. The hash check is accomplished in two stages. The first stage reads the entry at the location specified by a fixed subset of bits within the signature. If the entry is valid and the signature stored in the entry is equal to the remainder of the content, signature, a match is returned. The second stage reads the entry at the location specified by an independent subset of bits within the content signature. If the entry is valid and the signature stored in the entry is equal, to the remainder of the content signature, a match is returned.

If a match is found in the DT1 CAM, the following actions are employed:

The Hit Count, Source Array, Destination Array for the entry are read in from the SRAM;

The Hit Count is incremented by 1;

The bits in the Source and Destination Array are set based on predefined bits, in the source and destination IP hashes; and The Hit Count and the number of bits set in the Source and Destination Array are compared to programmable thresholds, and if all the threshold criteria are met, a signal is sent to the DT2 to create a new entry for the signature and the signature is removed from the DT1 CAM.

If a match occurs in either of the DT2 structures, the following actions are employed:

The remaining content dispersion table fields are read in for the entry from the SRAM;

The Hit Count is incremented by 1;

The update time is set to the current timestamp;

The update bit is set to 1;

The source/destination arrays are updated based on the source and destination hashes; and If the number of bits in the source/destination arrays are greater than or equal to a programmable threshold the source/destination scaling factors are incremented and the bit arrays are cleared.

Figure 8:
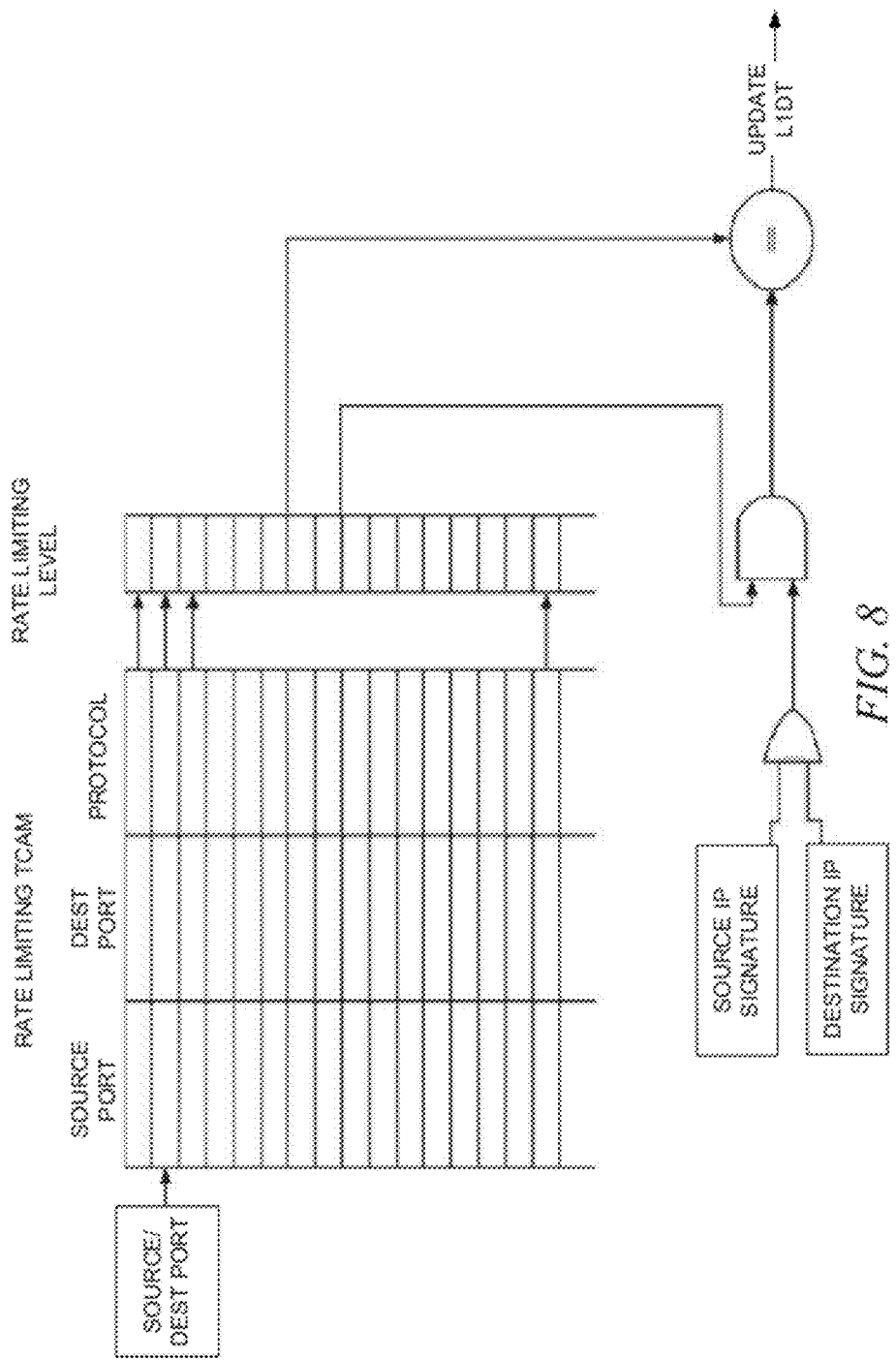
FIG. 8 illustrates a biasing of the probability of adding input traffic to the DT1 dispersion table based upon traffic type in accordance with an aspect of the subject matter of the application.

Turning now to FIG. 8, if a match is not found in the DT1 or DT2, the DT1 can determine whether or not to create a new entry for the signature. In an aspect, the signature has to pass several tests before it is added to the DT1. One goal of these tests is to ensure that the signatures are selected across a wide range of IP addresses, services and distributed over time. An example test would be to value sample based upon the Source and Destination IP address. To execute this test, the aspect passes the Source and Destination IP address through a hash function and chooses to select the signature based on the value of certain bits in the hash result. The bits selected and the value compared against can be programmed at a fine granularity, for example it is possible to have different bits to compare and the value to compare against for every port and so on.

Continuing with the example, the second DT1 sampling test is based on linear feedback shift register (LFSR). The LFSR value is ANDed with a programmable mask and compared to a programmable value. If these values match, the DT1 attempts to add the signature at the location pointed to by the head pointer. If the old entry is not valid or the current time minus the init timestamp for the entry is greater than the minimal DT1 lifespan a new entry will be created. A new entry is initialized by writing the new signature into the CAM at the position pointed to by the head pointer, and writing the corresponding hit count, source array, destination array, and hit time in the SRAM.

Figure 9:
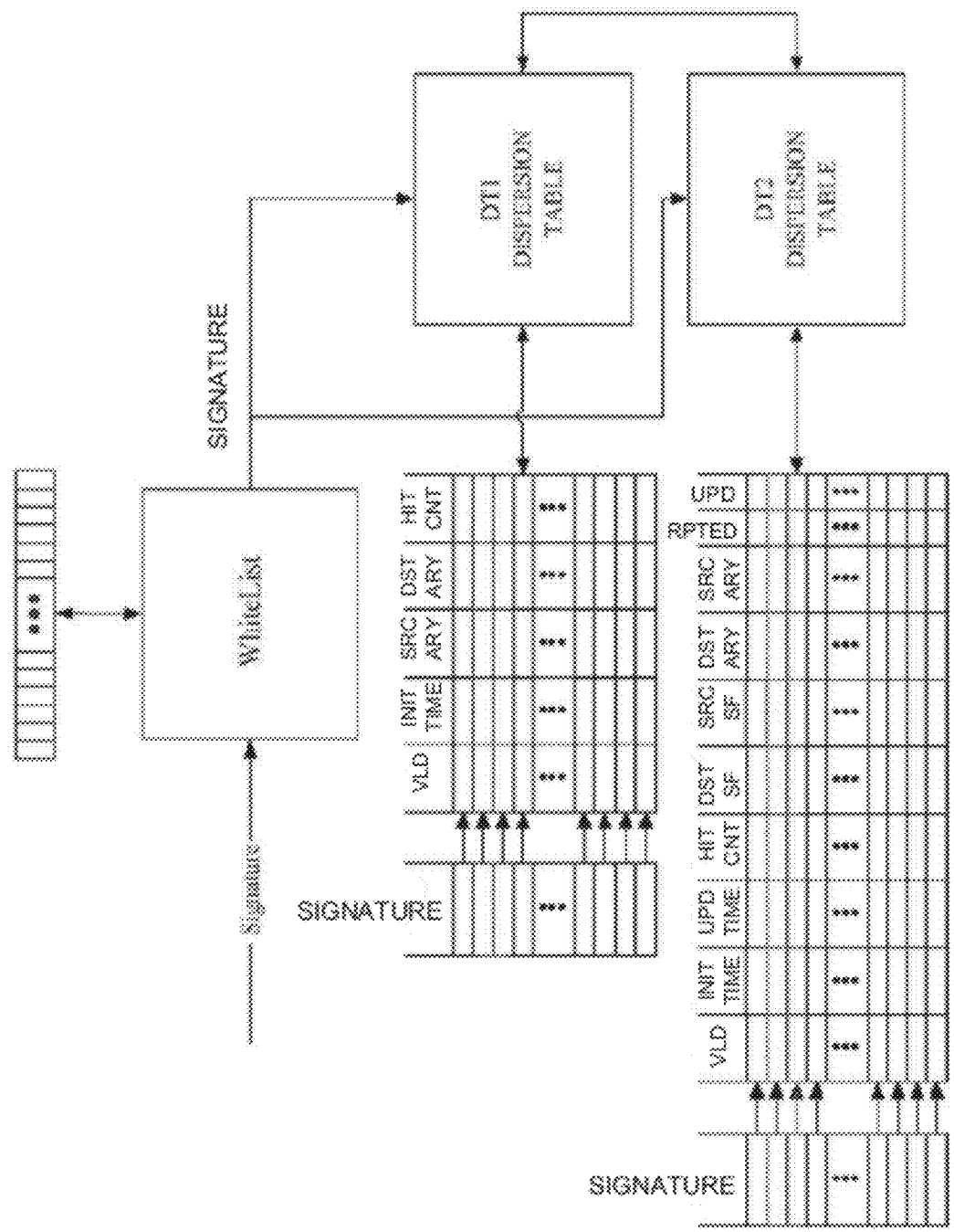
FIG. 9 illustrates an architectural diagram of the interaction between the white list and the DT1 and DT2 dispersion tables in accordance with an aspect of the subject matter of the application.
Figure 10:
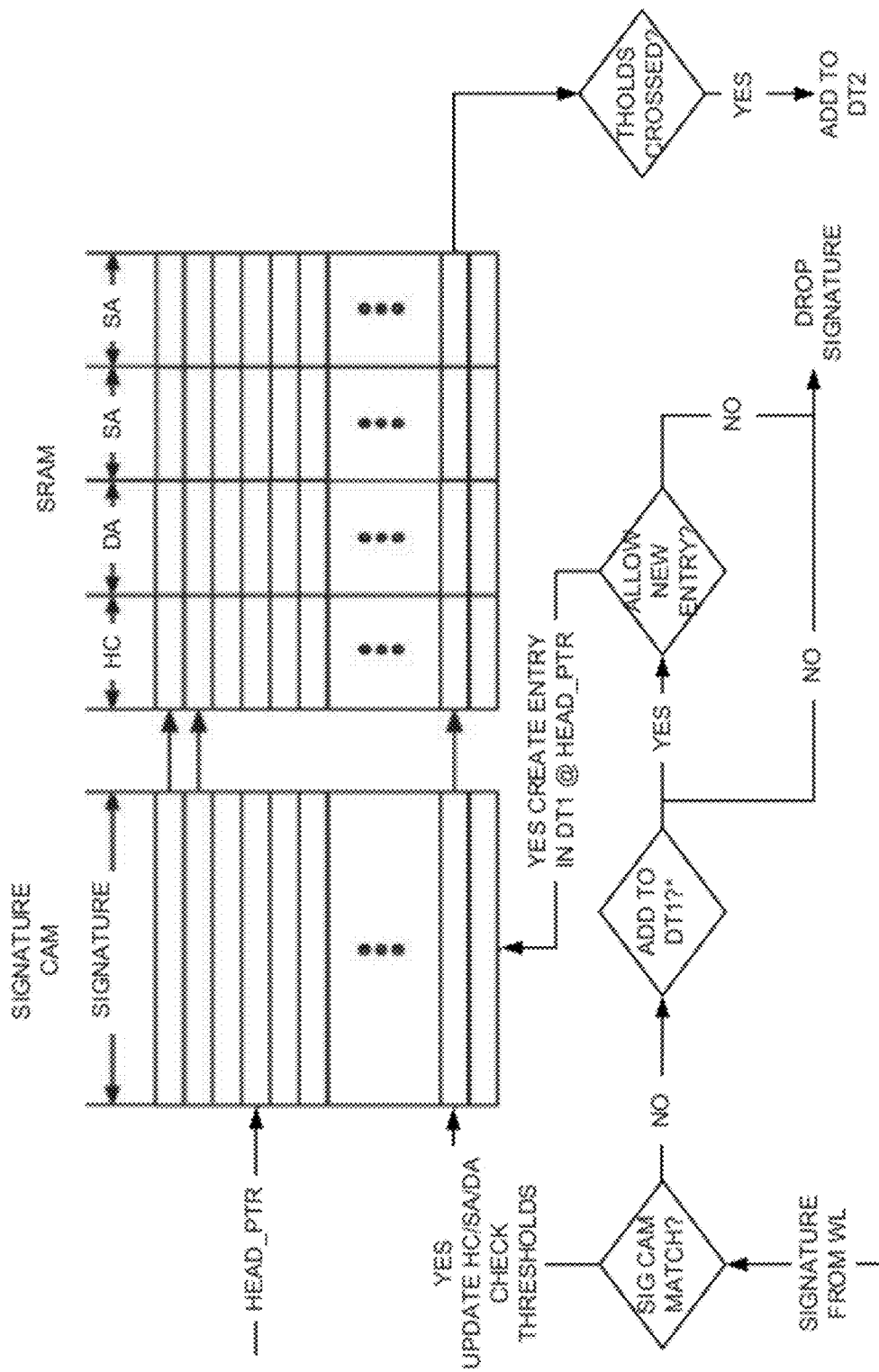
FIG. 10 illustrates a block diagram of the functionality of a DT1 dispersion table in accordance with an aspect of the subject matter of the application.

When a new signature is written into the DT1 CAM, overwriting a valid old entry, the fields of the old entry will be compared to the white list threshold registers and if the thresholds are met, a report for the signature is sent to the director to potentially white list the entry (this would occur for entries with high hit counts and low dispersion counts). If on the other hand, the old entry does not meet the minimum lifespan criteria, the head pointer will be incremented and the new signature will not be added. FIG. 9 illustrates an architectural diagram of the interaction of the white list 206 and the DT1 and DT2 tables in accordance with an aspect of the subject matter of the application. FIG. 10 further illustrates a block flow diagram of the functionality of the DT1 table in accordance with an aspect of the application.

While, for purposes of simplicity of explanation, the one or more methodologies shown herein, e.g., in the form of a flow diagram, are shown and described as a series of acts, it is to be understood and appreciated that the subject application is not limited by the order of acts, as some acts may, in accordance with the application, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the application.

As illustrated in FIG. 10, if a match is not found in the DT2, it waits for a signal from the DT1 to inform whether or not to create a new entry. If this signal is received from the DT1, a new entry is created provided that there is available space in the hash or the CAM. If the entry in the Hash is not marked valid or meets the timeout criteria (as described below), an entry is created there; otherwise it creates the entry in the CAM provided there is an available address.

In operation, a new entry is created in the following manner:

Valid bit is set to 1;

New signature is written into CAM or SRAM;

If writing to SRAM Hash, The H1/H2 bit is set depending on if the first or second hash function is used (0=first, 1=second);

Hit Count is set to 1;

Update time and initialization time are set to the current timestamp;

Update bit is set to 0.1;

The source/destination arrays are updated based on the source and destination hashes; and The source/destination scaling factors are set to 0.

If the CAM is completely full or there are no entries available in the free-list and the hash entry is being used by another signature that cannot be removed, a collision counter will be incremented and no further action will be taken.

The entry may be removed from the DT2 Dispersion Table if any of the following criteria are met:

Entry is marked as reported and the length of time since the last update has exceeded the report inactive timeout period;

The entry's RPT indication is not set and any of the following are true:
  the time since the last update has exceed the inactive threshold;
  the number of intervals that the entry has been in existence for multiplied by rate threshold is greater than the hit count; or
  the lifespan of the entry is greater than the active threshold and the source count AND destination counts are less than a minimum threshold.

The content dispersion block contains one background task that keeps a list of free addresses that can be used for new signature storage in the DT2 CAM. This task will add entries which meet the timeout criteria and remove entries when CAM updates occur.

Software can be responsible for periodically reading each entry in the DT2 and reporting the latest counter values. The software can have backdoor read access to the DT2. When the software issues a read to each entry, this will cause the update bit in the entry to be invalidated. The software then reads the LSBs of the entry and checks to see if the entry is marked as valid, has been reported and has the update bit set. If these three conditions are met, the entire entry is read and a counter update report packet is sent by the software.

The final responsibility for the DT2 is to inform the output buffer 210 when the end of packet for the current packet has arrived. If a signature is the last signature of the packet, the end of packet indication will be forwarded to the output buffer to indicate that the packet can be removed from the output buffer FIFO.

Turning now to a discussion of the output buffer 210, the first responsibility of the output buffer 210 is to store the packet data and header fields in separate FIFO structures until the packet can be sent downstream. The output buffer 210 also has a separate internal packet buffer which will store the entire packet while it is being processed by the other SLB modules and will either drop the packet or forward it to the CPU when an end of packet indication is received from the DT2 block.

The second function of the output buffer 210 is to determine whether or not each packet will be processed with respect to the SLB block. If it is determined that the packet should not be processed by the SLB block, the packet will not be stored in the output buffer 210 internal packet FIFO, but will still be forwarded. The final responsibility of the output buffer 210 is to receive report indications from the DT2 dispersion table. If a packet is market to be reported, a report packet header is generated by the output buffer 210 containing the message length, signature offset, and the signature location within the DT2. This report packet header, followed by the entire packets is send to the CPU packet buffer.

Figure 11:
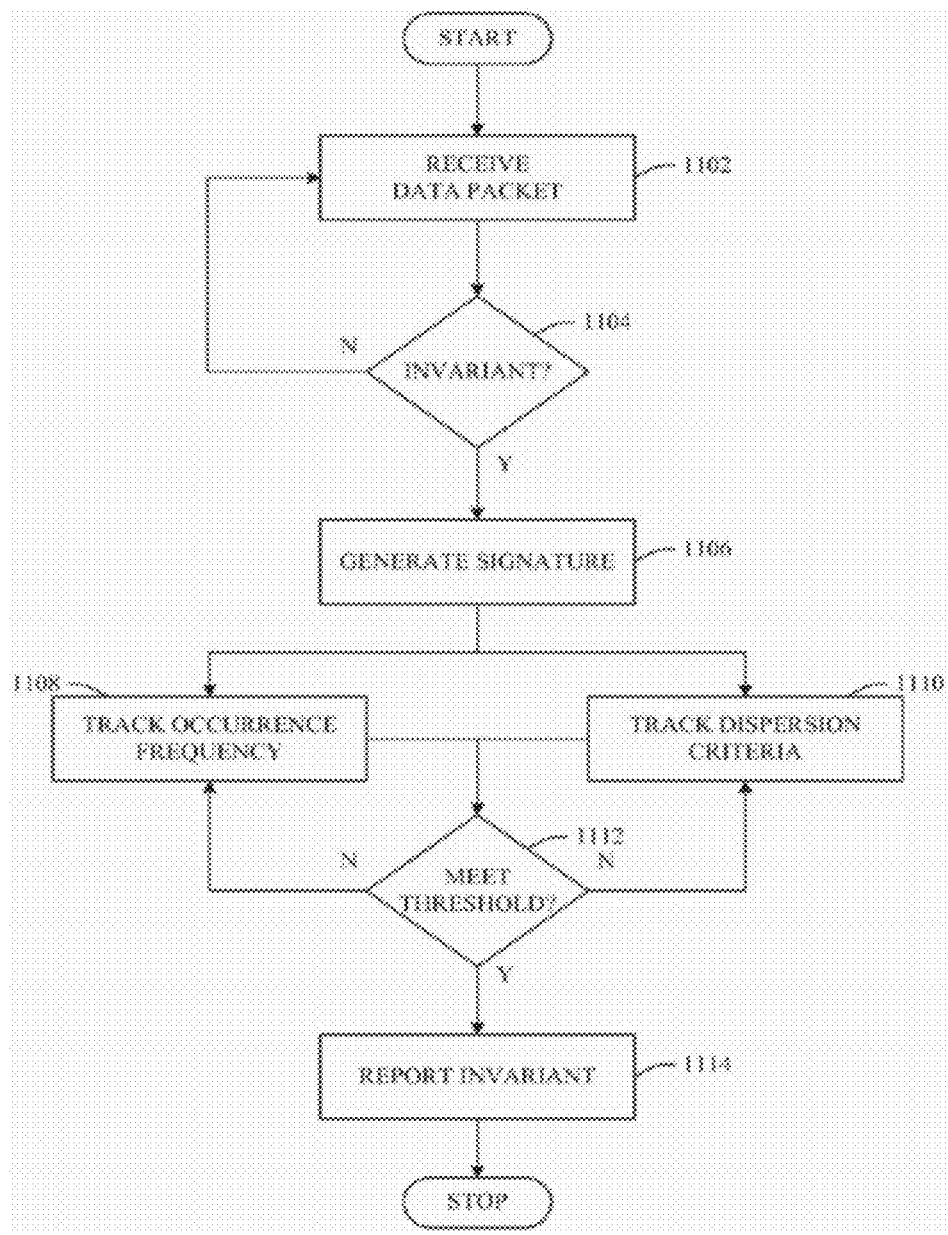
FIG. 11 illustrates an exemplary flow chart of procedures that facilitate reporting an invariant in accordance with an aspect of the subject matter of the application.

FIG. 11 illustrates a methodology of identifying and reporting an invariant in accordance with an aspect of the application. At 1102, a data packet, or group of data packets is received. As illustrated by the decision loop at 1104, it is to be understood and appreciated that the data packet passes if no invariant is found to be present.

At 1106, a signature can be created for the invariant. The signature can be generated as described in the aforementioned Related Applications, which are incorporated herein by reference. It will be appreciated that this signature enables tracking of the frequency and dispersion of the invariant.

As illustrated, the invariant occurrence frequency and dispersion criteria can be tracked at 1108 and 1110 respectively. As described in greater detail supra, the subject system employs a two-level dispersion table, DT1 and DT2, that concurrent tracks the occurrence frequency and dispersion criteria. A decision is made at 1112 if a frequency or dispersion threshold is met.

If a threshold is not met at 1112, the process returns to 1108 and 1110 to continue tracking the suspect invariant. On the other hand, if a threshold is met, the system can report the invariant at 1114. Similarly, the technology can quarantine, block, remove and/or cleanse the system of the suspect invariant.

Figure 12:
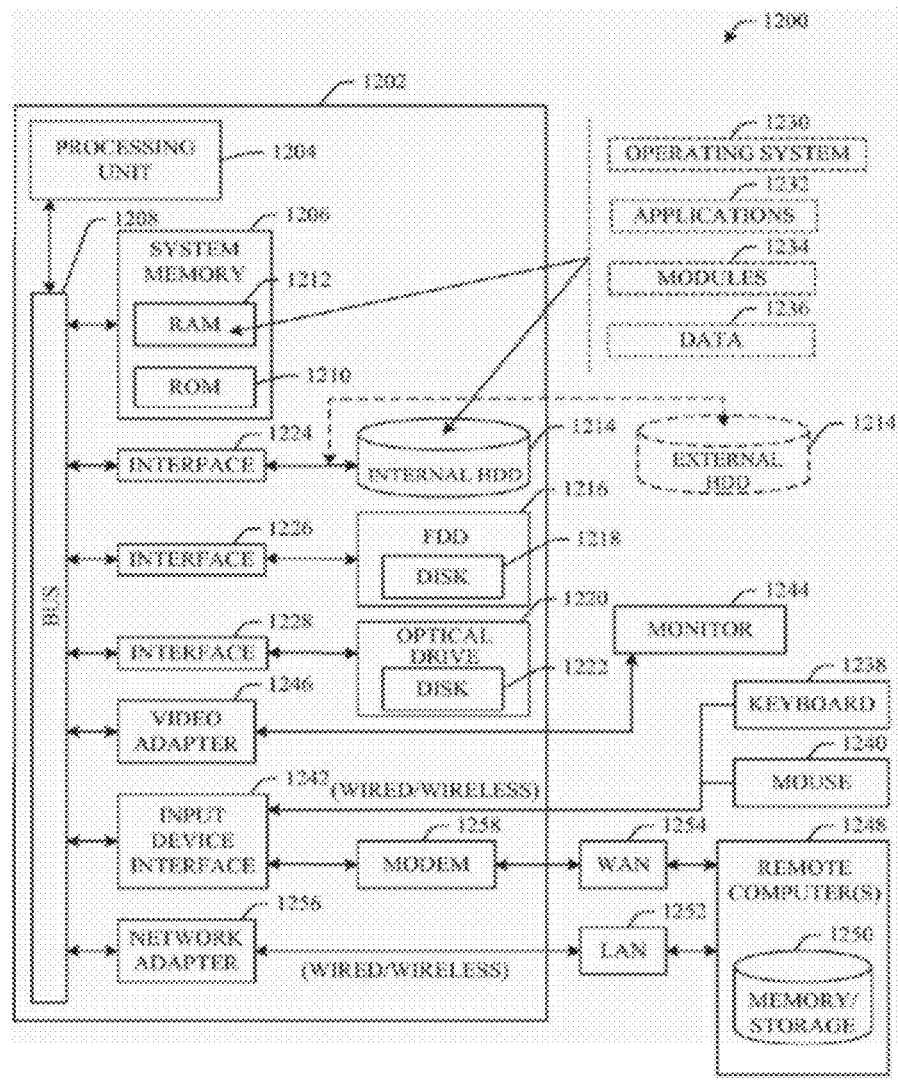
FIG. 12 illustrates a block diagram of a computer operable to execute the disclosed architecture.

Referring now to FIG. 12, there is illustrated a block diagram of a computer operable to execute the disclosed invariant detection architecture. In order to provide additional context for various aspects of the subject application, FIG. 12 and the following discussion are intended to provide a brief, general description of a suitable computing environment 1200 in which the various aspects of the application can be implemented. While the technology has been described above in the general context of computer-executable instructions that may run on one or more computers, those skilled in the art will recognize that the subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the application may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the application includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject application.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the application.

A number of program modules can be stored in the drives and RAM 1212, including an operating system 1230, one or more application programs 1232, other program modules 1234 and program data 1236. All or portions of the operating system, applications, modules, and/or data can also be cached in the SRAM 1212. It is to be appreciated that the application can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the application. It is, of course, not possible to describe every conceivable combination of components or methodologies for purposes of describing the subject application, but one of ordinary skill in the art may recognize that many further combinations and permutations of the application are possible. Accordingly, the application is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable storage medium having stored thereon a data-structure that facilitates identification of an invariant, comprising:
 a first table that includes a first set of columns that represent dispersion criteria that correspond to a plurality of invariants; and
 a second table that includes a second set of columns that represent dispersion criteria that correspond to a subset of the plurality of invariants derived as a function of a dispersion threshold; and
 a signature learning block communicatively coupled to the machine-readable storage medium, the signature learning block configured to use the data-structure to concurrently track
 an occurrence frequency rate and a dispersion criterion associated with the plurality of invariants.

2. The non-transitory machine-readable storage medium of claim 1, the first set of columns includes a signature value, a hit rate value, a source array value, and a destination array value.

3. The non-transitory machine-readable storage medium of claim 1, the second table includes a first stage hash-based portion and a second stage overflow portion.

4. The non-transitory machine-readable storage medium of claim 3, the first stage hash-based portion includes a plurality of columns that comprise a signature value, an initial time, an update time, a hit count, a destination scaling factor, a source scaling factor, a destination bit array, a source bit array, and a reported flag.

5. The non-transitory machine-readable storage medium of claim 3, the second stage overflow portion includes a plurality of columns that comprise a signature value, art initial time, an update time, a hit count, a destination scaling factor, a source scaling factor, a destination array, a source array, and a reported flag.

6. A system that Facilitates virus detection, the system comprising:
 a non-transitory machine-readable storage medium including a data-structure, the data-structure including a first table and a second table, the first table including a first set of columns that represent dispersion criteria that correspond to a plurality of invariants, and the second table including a second set of columns that represent dispersion criteria, that correspond to a subset of the plurality of invariants derived as a function of a dispersion threshold;
 a signature learning block communicatively coupled to the machine-readable storage medium, the signature learning block configured to use the data-structure to concurrently track an occurrence frequency rate and a dispersion criterion associated with the plurality of invariants.

7. The system of claim 6, wherein the signature learning block employs:
 the first table to filter the plurality of invariants, into a plurality of filtered invariants, having a minimal level of dispersion based upon the occurrence frequency rate and the dispersion criterion; and
 the second table to track a spreading behavior of the plurality of filtered invariants.

8. The system of claim 7, further comprising a direct bitmap counter that establishes the occurrence frequency rate and the dispersion criterion.

9. The system of claim 7, further comprising a scalable bitmap counter that establishes the spreading behavior as a function of the occurrence frequency rate and the dispersion criterion.

10. The system of claim 6, wherein one of the columns within the first table represents a dispersion criterion that defines a plurality of hosts associated with the subset of invariants.

11. The system of claim 6, wherein the signature learning block employs the first table to filter a prevalent signature based upon a threshold of dispersion, and the second table to track a spreading behavior of the prevalent signature.

12. The system of claim 11, wherein the signature learning block employs the second table to report the prevalent signature to a director as a function of a dynamic threshold.

13. A method comprising:
 maintaining a data structure to facilitate monitoring of a plurality of invariants, the data structure including a first table and a second table, the first table including a first set of columns that represent dispersion criteria that correspond to the plurality of invariants, and the second table including a second set of columns that represent dispersion criteria that correspond to a subset of the plurality of invariants derived as a function of a dispersion threshold;
 tracking, using one or more processors, an occurrence frequency of an invariant within the data structure;
 concurrently tracking, a dispersion criteria of the invariant within the data structure; and
 reporting the invariant based upon the occurrence frequency and the dispersion criteria as a function of a dynamic threshold.

14. The method of claim 13, further comprising locating the invariant within at least one of a packet header and a packet payload of a received data packet of arbitrary length.

15. The method of claim 14, further comprising selecting the invariant as a function of time, protocol, and packet.

16. The method of claim 13, further comprising, setting a desired length for the invariant.

17. The method of claim 13, further comprising white listing the invariant based upon the frequency and the dispersion criteria as a function of the dynamic threshold.

18. The method of claim 13, further comprising establishing a signature for the invariant; the signature facilitates tracking of the frequency and the dispersion criteria.

19. The method of claim 18, further comprising combining signatures of at least two invariants to establish the signature.

20. The method of claim 13, the acts of tracking include tracking at a line rate in excess of 5 Gbps.

* * * * *

UNITED STATES PATENT AND TRADEMARK OFFICE
CERTIFICATE OF CORRECTION

| | |
|---|---|
| PATENT NO. | : 8,185,745 B2 |
| APPLICATION NO. | : 12/956725 |
| DATED | : May 22, 2012 |
| INVENTOR(S) | : Singh et al. |

It is certified that error appears in the above-identified patent and that said Letters Patent is hereby corrected as shown below:

In column 13, line 34, in Claim 5, before "art", insert --an--, therefor

In column 13, line 38, in Claim 6, delete "Facilitates" and insert --facilitates--, therefor Signed and Sealed this
Second Day of October, 2012

David J. Kappos
*Director of the United States Patent and Trademark Office*